United States Patent [19]

Hjorth

[11] Patent Number: 5,466,186
[45] Date of Patent: Nov. 14, 1995

[54] DEVICE FOR PROCESSING FLAT FISH

[75] Inventor: Jens Hjorth, Seattle, Wash.

[73] Assignee: Royal Seafoods, Inc., Seattle, Wash.

[21] Appl. No.: 340,149

[22] Filed: Nov. 15, 1994

Related U.S. Application Data

[63] Continuation of Ser. No. 97,966, Jul. 27, 1993, Pat. No. 5,378,194.

[51] Int. Cl.⁶ .................................................. A22C 25/14
[52] U.S. Cl. ........................ 452/170; 452/149; 452/151;
452/157; 452/166
[58] Field of Search ............................... 452/170, 149,
452/150, 151, 154, 155, 160, 157, 166

[56] References Cited

U.S. PATENT DOCUMENTS

| | | | |
|---|---|---|---|
| 3,187,375 | 6/1965 | Williamson et al. | 452/149 |
| 3,919,741 | 11/1975 | Backhaus et al. | 452/170 |
| 4,025,988 | 5/1977 | Hartmann et al. | 452/170 |
| 4,050,118 | 9/1977 | Wenzel | 452/149 |
| 4,291,435 | 9/1981 | Hartmann | 452/157 |
| 4,321,729 | 3/1982 | Ollik | 452/170 |
| 4,463,478 | 8/1984 | Hartmann et al. | 452/170 |
| 4,476,610 | 10/1984 | Wenzel | 452/170 |
| 4,557,019 | 12/1985 | Van Devanter et al. | 452/157 |
| 4,649,603 | 3/1987 | Bartels | 452/157 |
| 4,715,092 | 12/1987 | Lerner et al. | 452/149 |
| 4,748,723 | 6/1988 | Braeger et al. | 452/152 |
| 4,756,058 | 7/1988 | Gollnitz et al. | 452/157 |
| 4,868,951 | 9/1989 | Akesson et al. | 452/155 |
| 4,899,422 | 2/1990 | King | 452/157 |
| 5,061,221 | 10/1991 | Holzhuter et al. | 452/157 |
| 5,192,243 | 3/1993 | Weustink | 452/157 |
| 5,259,810 | 11/1993 | Evers et al. | 452/170 |
| 5,352,153 | 10/1994 | Burch et al. | 452/170 |

FOREIGN PATENT DOCUMENTS

| | | | |
|---|---|---|---|
| 0116782 | 8/1984 | European Pat. Off. . | |
| 0286468 | 10/1988 | European Pat. Off. . | |
| 0459558 | 12/1991 | European Pat. Off. . | |
| 887066 | 11/1943 | France . | |
| 2205275 | 5/1974 | France . | |
| 2349660 | 4/1975 | Germany . | |
| 2553586 | 8/1976 | Germany . | |
| 2927583 | 4/1980 | Germany . | |
| 1668 | 7/1967 | Iceland . | |
| 621956 | 8/1978 | U.S.S.R. | 452/157 |
| 1376624 | 12/1974 | United Kingdom | 452/157 |

Primary Examiner—Willis Little
Attorney, Agent, or Firm—Christensen, O'Connor, Johnson & Kindness

[57] ABSTRACT

An apparatus and method for processing fish (24), especially sole, is disclosed. The apparatus includes a frame having a longitudinal axis along the direction of movement of the fish as they are processed. The fish are placed onto a conveyor (200) that includes blocks (204) for centering the fish and advancing them parallel to the longitudinal axis of the frame and into jaws (202). The jaws open as the fish passes through and measure each fish as well as help center the fish. The length measurement taken by the jaws is sent to a logic controller that determines the approximate dimensions of the fish. The controller uses this information to activate cutters at the proper times. The cutters include dorsal and anal fin cutters (212, 210), a tail cutter (214), and a head and organ cutter (216). The fish is carried into the cutters by spiked belts (222, 224, 230, 232, 234). The belts also transport the fish through an exit chute (362) into more processing equipment or simply into an exit bin. Circular blades (312, 314) are used for the dorsal and anal fin cutters. The blades are moved transverse to the longitudinal axis of the frame as they cut the fins. The tail cutter and head and organ cutter are constructed of flat steel bars with serrated edges. These cutters are activated at the proper time by the logic controller to swing around and cut off the tail, head, and organs.

20 Claims, 7 Drawing Sheets

DEVICE FOR PROCESSING FLAT FISH

This is a continuation of the prior application Ser. No. 08/097,966, filed Jul. 27, 1993, the benefit of the filing date of which are hereby claimed under 35 U.S.C. § 120, now U.S. Pat. No. 5,378,194.

FIELD OF THE INVENTION

The present invention relates to fish processing equipment, and more specifically, to equipment designed to cut the heads, organs, tails, and fins off of flat fish, such as sole.

BACKGROUND OF THE INVENTION

Commercial fishermen catch and process tons of fish a day. Many fishermen have complex, highly automated processing equipment that dresses the fish and produces numerous different commercial products for commercial retailers, such as restaurant chains or grocery stores. Such equipment is highly specialized to perform a specific task, such as cutting the heads and tails off, filleting, deboning and skinning, etc. One of the reasons such equipment must be tailored to specific tasks is the large variety of shapes and sizes of fish processed, including pollock, salmon, trout, sole, cod, etc.

To reduce overall processing costs and to improve quality, some commercial fishing vessels include processing equipment and freezers located directly on the ships. As the fish are caught, they are immediately processed and frozen, substantially improving the quality of the final product. This also allows the vessels to remain at sea for long periods of time without transporting the fish to a shore-based processing facility. Most of the processing equipment is large, complex, and expensive. It is difficult and expensive to remove the processing equipment from the vessel and replace it with new processing equipment.

Because of the expense associated with exchanging the processing equipment, including vessel down time, most commercial processing ships are intended to catch and process specific types of fish. As an example, the vessel may be fitted with processing equipment designed to process generally oval fish having a relatively thick cross section, such as pollock or salmon, or generally flat fish having a relatively thin cross section, such as sole. Due to the natural migration of fish, and various fishing laws, individual types of fish are caught and processed during limited times of the year. Therefore, vessels having equipment capable of processing only one type of fish sit idle during long periods of the year. If the processing equipment were available to process flat fish, such as sole, the vessels could be operated over a larger part of the year. This would, in turn, reduce the amount of down time and associated expense for the vessels.

One manufacturer of fish processing equipment is Baader GmbH & Co. KG, Lubeck, Germany ("Baader"). One of the many fish processing machines produced by Baader is the Baader 182. The Baader 182 is designed to process pollock and salmon-shaped fish and includes a conveyor having a plurality of fish holders mounted along the length of the conveyor. Each fish holder includes a recess configured to receive a pollock. While the processor is operating, a worker removes fish from a fish hopper located next to the conveyor and places an individual pollock in the recess of each fish holder. The conveyor subsequently moves the fish holders and pollock along the length of the conveyor into contact with rotating blades that cut both the head and the tail of the pollock off. The body of the pollock is then carried to additional equipment that cuts the pollock into fillets and removes the bones and skin.

The Baader 182 works well with fish having an oval cross section, such as pollock, but does not allow other types of fish to be processed. The Baader 182 is particularly unsuitable for processing fish with a relative flat cross section, such as sole. The fish holders used on the Baader 182 are not capable of holding such fish during processing. Nor can the Baader 182 remove the dorsal and anal fins of a flat fish.

In addition to having a relatively thin cross section, the body of a sole also has a smaller length to height ratio than pollock or salmon, i.e., the body of a sole is more oval-shaped when viewed from the side. The shape of the sole presents additional problems in processing. The orientation of the body of the sole must be carefully maintained to ensure that the head, tail, and dorsal and anal fins are removed in such a way as to leave the majority of the body intact. If the orientation of the sole is improper, the sole tends to be cut at angles that either remove too much of the body or leave parts of the head or tail. Therefore, it is important that the sole or similarly-shaped fish be carefully centered within the fish holders or belts before and/or while being brought into contact with the cutting knives.

Therefore, one goal of the present invention is to provide equipment to process flat fish, such as sole, to quickly and efficiently remove heads, tails, anal and dorsal fins, and internal organs. Another goal of the present invention is to allow processing equipment to center flat fish within the processing equipment and accurately cutting along outer body shapes while holding the fish, such that the head, tail fins, and organs, may be removed without costly losses of meat.

Additionally, the fish may be fed directly into other equipment to, for example, fillet and/or skin the sole or other flat fish. Another goal of the present invention is to speed the entire process such that fewer machines are actually required to accomplish the task and/or the time between catching and freezing the fish is shortened to provide an even fresher fish product.

SUMMARY OF THE INVENTION

The present invention is a fish processor for removing the head, internal organs, dorsal and anal fins, and tail of flat fish, especially sole. The equipment of the present invention may be installed aboard ship to process fish as they are being caught. Because of the capabilities of the equipment of the present invention, ships now idle during some periods of the year will be able to fish and process fish for longer periods since they can process flat fish in addition to other fish quickly and efficiently. The equipment of the present invention can be coupled to other processing equipment such as filet machines and skinning machines. The freshly caught fish are simply sent through the equipment of the present invention and channeled through the other equipment to then be taken directly to a freezer. Thus, the labor intensive and dangerous job of cutting up the fish by hand can be eliminated.

The preferred embodiment of the apparatus of the present invention includes a mechanism for advancing the fish in a downstream direction. A device for measuring the length of the fish as the fish are advanced is also coupled with the advancing mechanism. Based on the length of the fish, a logic circuit or computer calculates the approximate geometry of the fish. At least one fin cutter removes the dorsal and anal fins of the fish in response to signals generated about the geometry of the fish. A tail cutter removes the tail from the fish as the fish is advanced. The tail cutter is coupled with the advancing mechanism downstream of the measuring device. A head and organ cutter is also coupled with the advancing mechanism downstream of the measuring device. The head and organ cutter removes the head and organs in response to signals from the logic circuit or computer.

In one embodiment of the invention, the advancing mechanism includes a holder for holding and centering the fish so that the fish may be cut along selected paths. The fish holder includes a conveyor, a holding means, and a centering means. The conveyor has an upper surface upon which the fish rests before being cut up. The holding means extend upwardly from the tray and over at least a part of the upper surface for securing the fish between the upper surface and the holding means. The centering means center the fish on the fish holder as the fish is placed and advanced on the fish holder.

A preferred embodiment of the invention includes an exit drive attached to the frame downstream of the cutters. The exit drive includes at least one drive belt for further advancing the fish after it has been cut. The exit drive preferably includes channeling arranged and configured to direct the fish into a filet machine.

In the preferred embodiment of the invention the advancing mechanism includes a conveyor having blocks attached on an outer surface forming a "V" shape within which the head of the fish is placed and the fish advanced to the measuring device. The conveyor preferably includes a central channel within which the tail of the fish is placed in the downstream direction such that the fish advances tail first. A tail spring is attached to the conveyor over the central channel. The tail spring is arranged and configured to place a downward force on the fish into the central channel as the fish advances beneath the tail spring to aid in centering the fish.

In one embodiment of the invention the measuring device comprises an electric eye that indicates to the computer when the tail and the head of the fish each pass a predetermined longitudinal location.

In the preferred embodiment the measuring device comprises jaws biased to a closed position. The jaws include a funnel portion through which the fish pass as they are advanced and a sensor to detect the opening and closing of the jaws. The opening and closing of the jaws are indicated to the computer. Preferably, the jaws also aid in centering the fish as they pass through the funnel portion. The jaws have two arms that are interlinked such that movement of one arm of the jaws causes an equal but opposite movement of the other arm.

In the preferred embodiment the advancing means also include a first drive belt having a means to engage the fish. One span of the belt extends generally parallel to the longitudinal axis of the frame. Preferably, the drive belt is arranged and configured to advance the fish from the measuring device through the at least one fin cutter for removing the dorsal and anal fins of the fish. A second drive belt is also disposed opposite the first drive belt. The second drive belt has one span extending generally parallel to the longitudinal axis of the frame opposite the span of the first drive belt that extends parallel to the longitudinal axis of the frame.

Preferably, the at least one fin cutter includes a right fin cutter and a left fin cutter. The right fin cutter is disposed adjacent and to the right of the first drive belt. The left fin cutter is disposed adjacent and to the left of the first drive belt. The right fin cutter comprises a first circular blade and first means to rotate the first circular blade. The left fin cutter comprises a second circular blade and second means to rotate the second circular blade. The blades are disposed at a predetermined angle to the longitudinal axis of the frame. A blade movement mechanism moves the right and left circular blades in right and left directions transverse to the longitudinal axis of the frame in response to the computer so that the contours of the fish are approximately followed as the fins are cut.

In the preferred embodiment of the present invention, the tail cutter comprises a tail blade and a tail cutter drive means activated by the computer to cut the tail of the fish as it passes a predetermined longitudinal location. The tail blade is rectangular in shape, having serrations on its leading edge. The tail cutter drive means are arranged and configured to rotate the blade in a direction transverse to the longitudinal axis of the frame to cut the tail of the fish. Preferably, the tail cutter also includes a water jet arranged and configured to spray the tail away from the fish after it is cut.

Also, in the preferred embodiment of the invention, the head and organ cutter comprises a head and organ blade and a head and organ cutter drive means. The drive means are activated by the computer to cut the head and internal organs of the fish from the fish as it passes a predetermined longitudinal location. The head and organ cutter drive means are arranged and configured to rotate the head and organ blade in a path generally transverse to the longitudinal axis of the frame to cut through the fish. The blade is comprises a serrated blade having three rectangular sections connected together. The first section cuts through the fish behind the head. The second section angles back past the organs. The third section cuts behind the organs. From the combination of the three cutting sections the head and organs are cut from the fish with one strike of the head and organ blade.

The present invention also includes a method for removing the head, organs, dorsal fin, anal fin, and tail of a flat fish. The preferred steps of the method include (a) placing the fish, tail first, eyes up, on a conveyor; (b) centering the fish on the conveyor while the fish is being advanced; (c) measuring the length of the fish while the fish is being advanced; (d) calculating the approximate dimensions of the fish based on the length determination; (e) advancing the fish through circular dorsal and anal fin cutting blades, the circular blades moving transversely as they cut so as to cut around the contour of the fish as the fish is advanced; (f) cutting the tail from the fish as the fish is advanced with a tail blade; (g) cutting the head and organs from the fish with a head and organ blade as the fish continues to advance; and (h) advancing the fish through an exit chute.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A preferred embodiment of the present invention will now be described with respect to FIGS. 1–7. The preferred embodiment shown is designed to process flat fish 24, such as sole, by running them tail first from a conveyor 200 on which they are placed through a series of cutters that remove the fins, tail, head, and organs, after which the fish is channeled into an output bin or additional processing equipment such as a filet machine and/or skinning machine.

Figure 1:
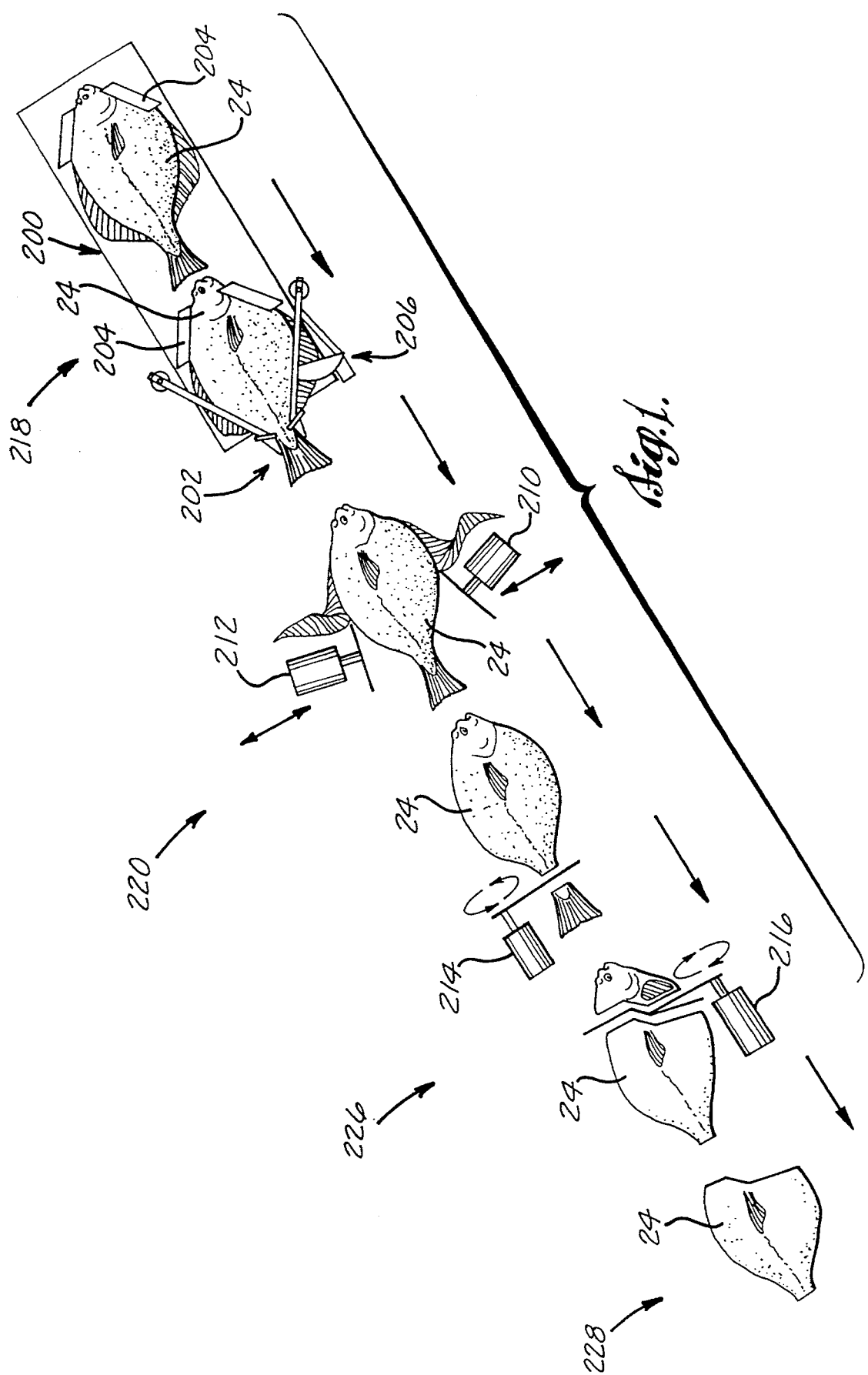
FIG. 1 is a schematic diagram illustrating the processing steps through which a sole is taken in cutting of the fins, head, and organs from the fish.

FIG. 1 shows schematically the steps carried out by the equipment described below in detail with reference to FIGS. 2–7. The apparatus of the present invention is used to remove the fins, tail, head, and internal organs from a sole prior to running the sole through a filleting machine and skinning machine. Throughout this description, the word "fins" refers to the dorsal and anal fins of the sole, the "right fin" being the anal fin on the right side of the sole as the eyes of the sole are placed up, and the "left fin" being the dorsal fin. The internal organs of a sole are located behind and to the right of the head of the sole.

Referring to FIG. 1, a fish 24 is placed on a conveyor 200 that moves the fish downstream from right to left into jaws 202 that operate as a fish sizing device to measure the length of the fish 24. As the fish 24 is moved downstream, conveyor blocks 204 center the fish 24 and help push it along into jaws 202. Jaws 202 include a sensor 206 that measures the amount of time that the jaws 202 are pushed apart by the fish 24 as it travels between them. Because the speed of the conveyor 200 and, accordingly, fish 24 is known, a computer connected to the sensor 206 can calculate the length of the fish. The computer then uses the calculated length to retrieve from a database the dimensions of a characteristic sole having the measured length. The retrieved dimensions of the characteristic sole are then used by the computer to timely activate a series of cutting blades used to remove the fins, tail, head, and internal organs, as explained in more detail below.

Fin cutters 210, 212 are the blades first reached by the fish 24. After passing through the jaws 202, the fins of the fish 24 are removed by these two fin cutters: a right fin cutter 210 and a left fin cutter 212. Relying upon the dimensions of a characteristic sole calculated above, the computer activates a mechanism to move the fin cutters 210, 212 in or out as the fish 24 advances, as shown by the arrows in FIG. 1. Preferably, fin cutters 210 and 212 are positional so that the fins are completely removed and a minimal amount of valuable fish is lost. After the fins are removed, the body of the sole advances past a tail cutter 214. The computer activates the tail cutter 214 at the proper time to remove the tail of the fish. The fish continues to move downstream, where the computer activates a head and organ cutter 216 at the correct time to cut off the head and internal organs as the fish 24 passes by.

A body portion having tail, fins, head, and internal organs removed remains. Preferably, drive belts then feed this remaining portion into additional processing equipment (not shown) that cuts the body into two fillets and removes the skin to produce the final product. The final product is then frozen for storage and shipment.

The advantages to a system such as that described above with reference to FIG. 1, are numerous. For example, the system greatly reduces processing time per fish as compared with other systems. The system feeds the fish 24 through the processing stages in one direction, tail first, to remove fins, tail, head, and organs in one quick pass without reorienting the fish 24. Sole can be run through the apparatus at approximately 80 to 120 fish per minute more than twice as fast as most current systems that perform the same functions.

Feeding the fish 24 through the equipment tail-first inherently provides another advantage. Since most filet machines, such as the Baader Model 175, are designed to receive flat fish tail first rather than sideways, no handling is required between the cutting apparatus of the present invention and the feed into the fillet machine. Also, many machines simply remove the head, internal organs, and tail of the fish 24, leaving the fins to be removed by hand before feeding the fish into other equipment for filleting. This extra step not only slows the mechanical process, but requires additional man-hours of work, and thus increases expense. With the cutting apparatus of the present invention, workers simply hand feed the fish 24 onto the conveyor 200 from a bin (not shown) containing the fish 24. The workers place the head of the fish 24 between the conveyor blocks 204 and the tail in the center of the conveyor 200, as described below. The workers do not handle dangerously sharp knives or other hazardous equipment.

The cutting apparatus of the present invention also results in diminished waste, since the computer-controlled cutters quite accurately remove the right amount of material from the fish 24 without cutting excessively into the meat of the fish.

Figure 2:
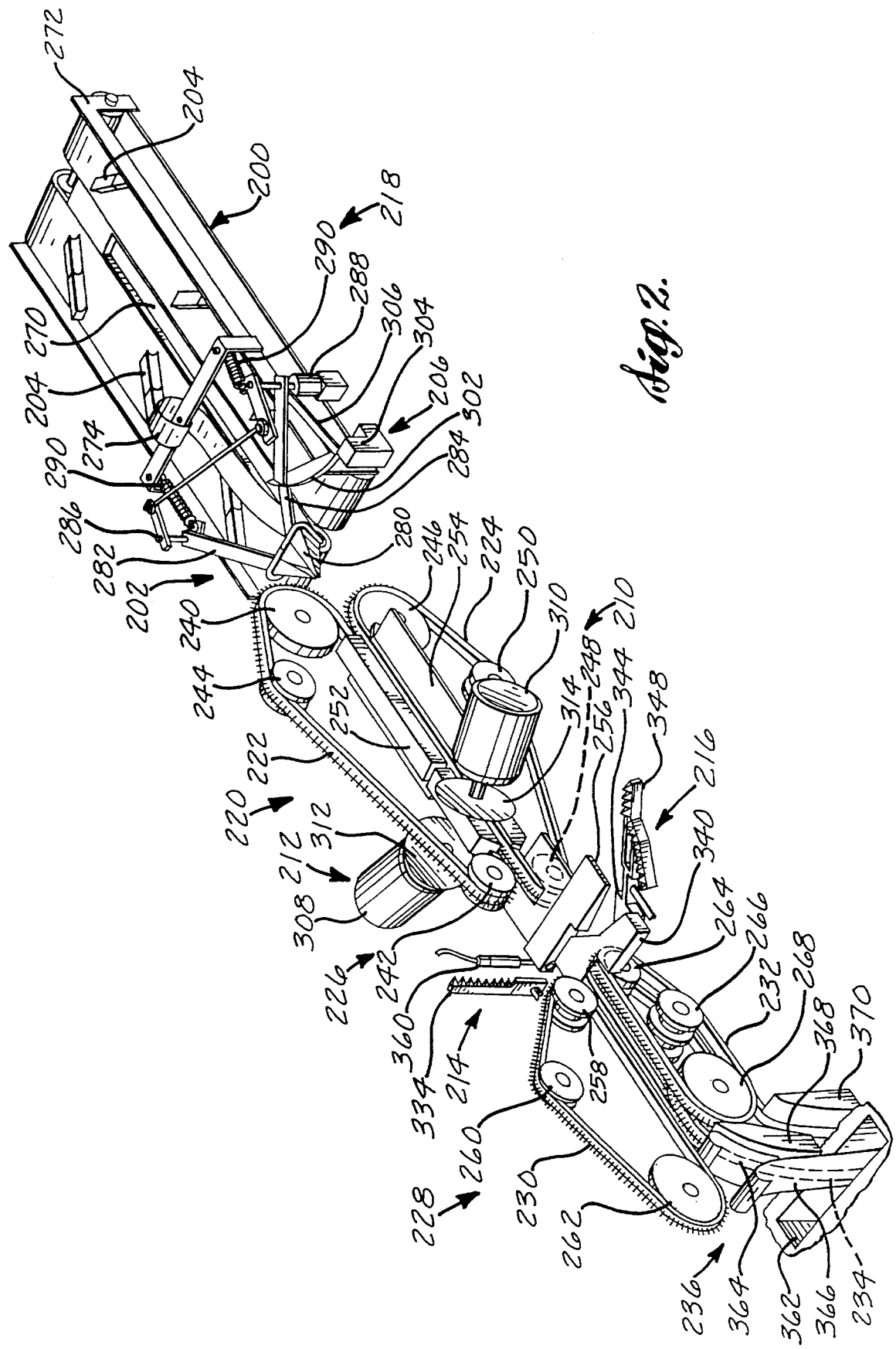
FIG. 2 is a simplified perspective view of the invention illustrating the main operative components that contact the fish as they are processed.

FIG. 2 presents an overall view of the major elements of a cutting apparatus formed in accordance with the present invention. The cutting apparatus advances the fish 24 through four processing stages or stations. A first station 218 includes the conveyor 200 and measuring jaws 202. A second station 220 includes a first drive belt 222 and a second drive belt 224, as well as the right and left fin cutters 210, 212. A third station 226 includes the tail cutter 214 and the head and organ cutter 216. Finally, a fourth station 228 includes a third drive belt 230, fourth drive belts 232, an exit belt 234, and an exit guide 236.

Referring now to the first station 218, shown in FIG. 2, the conveyor 200 comprises a split belt that runs in a direction parallel to the longitudinal axis of the cutting apparatus of the present invention. The split belt comprises dual endless side-by-side belts that carry the fish 24 to be measured and cut. Blocks 204 are attached to the outer surfaces of each of the belts to push the fish 24 through the jaws 202 and into the drive belts 222, 224. The blocks 204 are oriented at approximately a 45 degree angle to the longitudinal axis of the conveyor 200 such that a pair of blocks 204, one set of two end-to-end blocks on each belt, forms a V shape into which the head and forward portion of the body of the fish 24 are placed. The downstream-facing surface of the blocks 204, which abuts up against the head and forward portion of the fish 24, is concave, such that as the fish 24 is pushed into the jaws 202 and drive belts 222, 224, it is held from slipping out of the blocks 204. The spacing between sets of blocks 204 on the conveyor 200 is enough to space the fish 24 apart so that minimal or no overlap is achieved (see FIG. 3). Thus, the blocks 204 function as a holding means to secure and advance the fish 24 on the upper surface of the conveyor 200.

The jaws 202 are attached to the conveyor 200 at the downstream end of the conveyor 200, toward which the fish 24 are fed by the movement of the conveyor 200. As a fish 24 passes through the jaws 202, the length of the fish 24 is measured, and the fish 24 is centered. The first and second drive belts 222, 224 grasp the fish 24 before it passes completely through the jaws 202.

The first drive belt 222 runs within a vertical plane oriented along the central axis of the cutting apparatus. A first belt drive wheel 240 near the conveyor 200 moves first drive belt 222. A first idler wheel 242 is disposed downstream from the first belt drive wheel 240 such that the span of the first drive belt 222, between the first belt drive wheel 240 and the first idler wheel 242, is parallel to the longitudinal axis of the cutting apparatus. A first tensioner wheel 244 is also provided between the first belt drive wheel 240 and the first idler wheel 242 on an upper span of the first drive belt 222. The first tensioner wheel 244 is spring-loaded to keep the first drive belt 222 in proper tension as a fish 24 passes under it. The first drive belt 222 includes spikes protruding outwardly. These spikes engage the fish 24 and assure that it travels properly through the second station 220 of the cutting apparatus without slippage. The three first belt wheels 240, 242, 244 cause the first drive belt 222 to assume a generally triangular shape, the longest side of the triangle being that which contacts and drives the fish 24 through the second station 220. Note that the illustration and description of means to rotatably hold and drive the belt wheels has been omitted for clarity. Those skilled in the art will be able to easily devise adequate mechanisms to do so.

The second drive belt 224 substantially mirrors the first drive belt 222 about a horizontal plane just below the lower span of the first drive belt 222. The second drive belt 224 is driven by a second belt drive wheel 246 disposed opposite the first belt drive wheel 240. A second idler wheel 248 is disposed opposite the first idler wheel 242 at the downstream end of the second drive belt 224. Finally, a second tensioner wheel 250 is the lowest wheel of the second drive belt 224. The second tensioner wheel 250 is positioned and spring-biased to keep tension in the second drive belt 224. As with the first drive belt 222, the second drive belt 224 also includes spikes protruding outwardly from the belt to engage the fish 24 and assure its proper progression through the second station 220, especially as the fish 24 is being cut. Avoidance of slippage is critical, since the positioning of the belt is recorded and input into the computer so that signals to the cutters are sent at the proper times when a fish 24 is to be in the predetermined positions.

The lower span of the first drive belt 222 is guided by first hold-down blocks 252. First hold-down blocks 252 are spring-biased in a downward direction such that the belt stays in contact with the fish 24 during movement of the fish 24 between the first drive belt 222 and the second drive belt 224. The hold-down blocks 252 include a channel that faces downwardly and engages over the back portion of the lower span of the first drive belt 222. This is the side of the belt 222 from which spikes do not protrude. A first platform 254 is disposed opposite the hold-down blocks 252 adjacent to and underneath the upper span of the second drive belt 224. Thus, the fish 24 runs between the upper span of the second drive belt 224 on the first platform 254 and the lower span of the first drive belt 222 under the hold-down blocks 252 when in the second station 220.

The first platform 254 narrows as it approaches the right and left fin cutters 210, 212 to allow room for inward movement of the fin cutters. The right and left fin cutters 210, 212 are positioned near the downstream end of the first and second drive belts 222, 224 just upstream of the first and second idler wheels 242, 248. Further details of operation of the fin cutters 210, 212 will be described below in connection with FIGS. 4 and 5.

Still referring to FIG. 2, as the tail of the fish 24 passes into the third station 226 of the cutting apparatus over a head drop plate 256, the tail cutter 214 cuts the tail and the tail is pushed from the path of the fish 24, as described in detail below with reference to FIG. 5. At this point, the head and a portion of the body of the fish 24 are still engaged in the first and second drive belts 222, 224, and the fish 24 continues to travel downstream. A portion of the fish 24 advances between the third and fourth drive belts 230, 232 before the head of the fish 24 exits from the first and second drive belts 222, 224. Once the head of the fish 24 exits from the first and second drive belts 222, 224, it is in a proper position to be cut by the head and organ cutter 216. The head and organ cutter 216 quickly rotates to remove the head and internal organs as the fish 24 advances downstream. Further details of this third station 226 will be described below in connection with FIGS. 5 and 6.

As mentioned above, the fourth station 228 of the cutting apparatus of the present invention includes the third and fourth drive belts 230, 232, the exit belt 234, and the exit guide 236. The third drive belt 230 is similar to the first drive belt 224, except that a third belt drive wheel 262 is positioned at the extreme downstream end of the drive belt while a third idler wheel 258 is at the upstream end instead of the reverse. The third drive belt 230 is positioned within a vertical plane that runs through the central axis of the cutting apparatus. A third belt tensioner wheel 260 is positioned above the third belt drive wheel 262 and the third belt idler wheel 258 such that a triangular shape is formed from the belt with the longest span of the triangle being that on the lower portion of the belt between the third belt idler wheel 258 and third belt drive wheel 262. This lower span of belt is collinear with the lower span of the first drive belt 222. The third drive belt 230 also includes spikes that protrude outwardly to grip the fish 24.

The fourth drive belts 232 are positioned beneath the third drive belt 230. The fourth drive belts 232 comprise a dual-belt system. Two belts with outwardly facing spikes travel between three wheels, a fourth belt idler wheel 264, a fourth belt tensioner wheel 266, and an exit drive wheel 268. The belts 232 are separated by a space slightly wider than the drive belts. This allows an exit belt 234 to be coupled to the exit drive wheel 268 between the two fourth drive belts 232. The fourth drive belts 232 also form a triangular shape, with the longest span of the triangle being the upper span, which contacts and engages the fish 24 and moves it into the exit guide 236. The exit belt 234, since it is connected to the exit drive wheel 268, which also drives the fourth drive belt 232, runs at the same speed as the fourth drive belt 232 to continue the progress of the fish 24 through an exit chute 362 into a bin or another machine (not shown). Further details of the fourth station 228 of the cutting apparatus of the present invention will be described in connection with FIG. 7.

Figure 3:
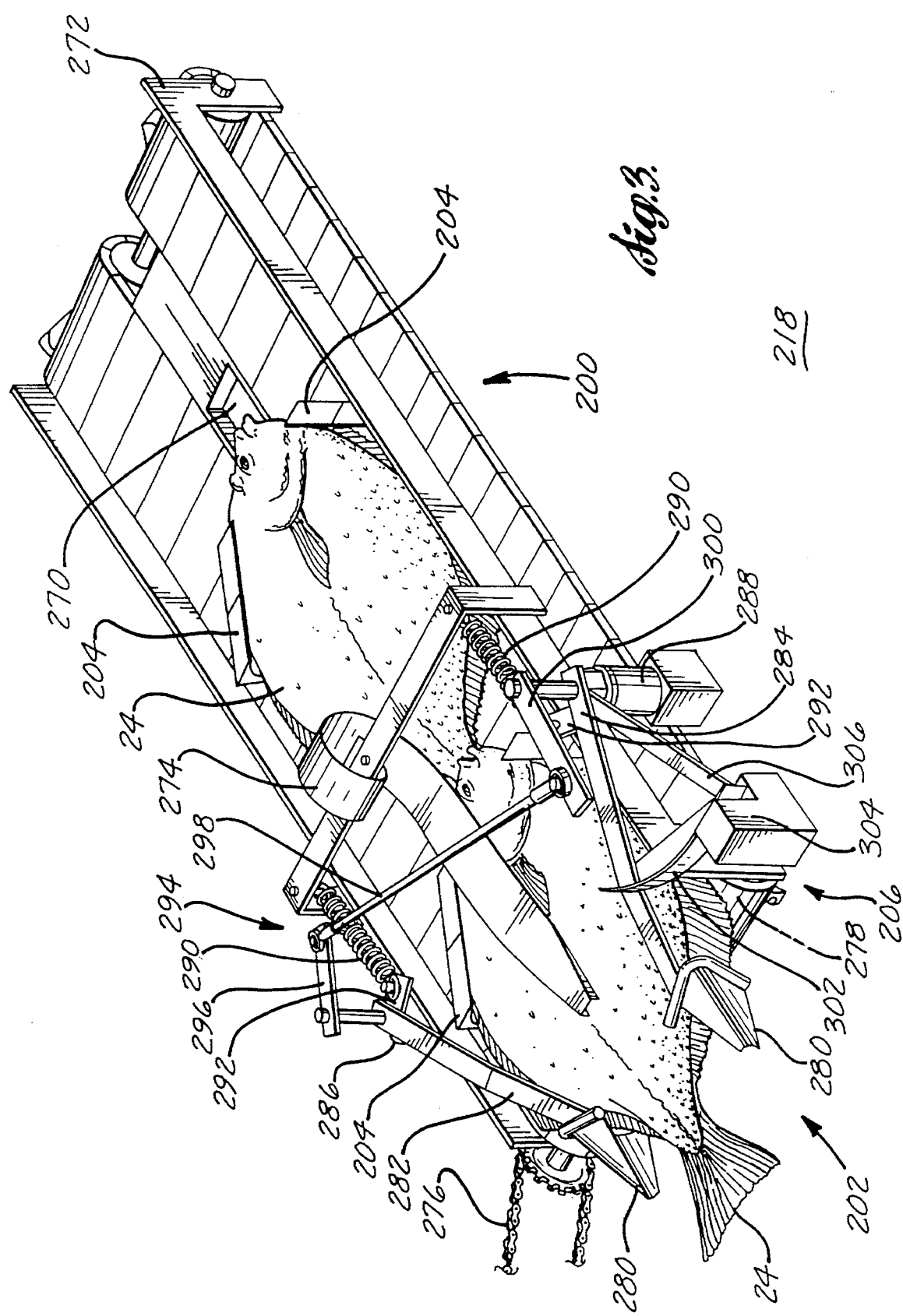
FIG. 3 is a perspective view of the conveyor belt of the present invention including measuring jaws.
Figure 6:
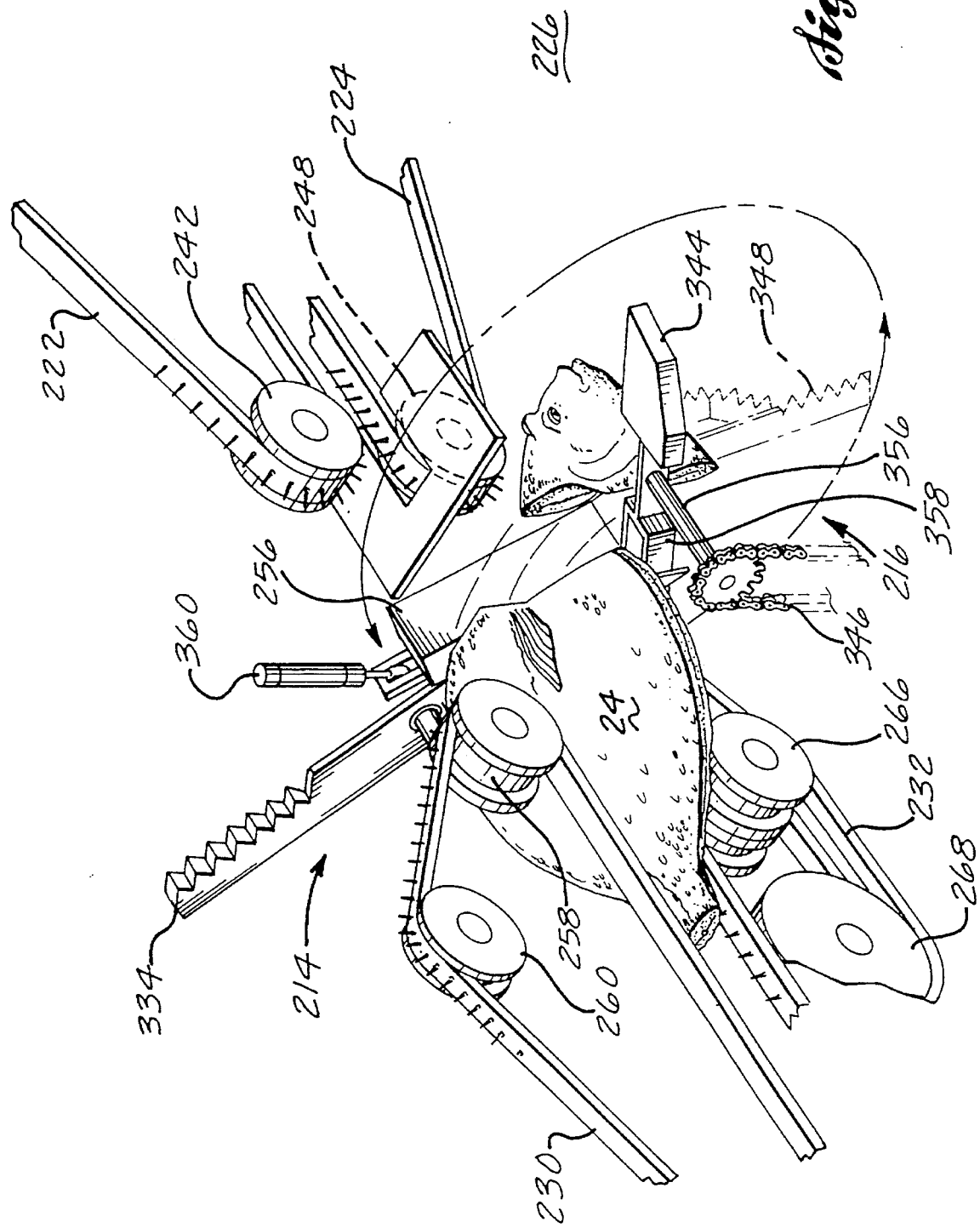
FIG. 6 is a perspective view illustrating the operation of the head and organ cutter of the present invention.

FIG. 3 illustrates the details of the first station 218 of the cutting apparatus of the present invention. In operation, workers place the fish 24 on the belt of the conveyor 200 with the tail in a channel 270 that runs down the center of the conveyor 200 between the two sides of the split belt. The belt runs over rollers that are connected to the conveyor frame 272. The conveyor frame 272 is connected to the main frame of the entire cutting apparatus. As explained above, the head and forward portion of the fish 24 are placed within the blocks 204, which are attached to the outer surface of the conveyor 200. The blocks 204 form a generally V shape with the point of the V being removed, such that the head extends therethrough. These blocks 204 tend to center the fish 24 on the conveyor 200 while serving to advance the fish 24 through the jaws 202 and into the drive belts 222, 224. Fish 24 are placed on the conveyor 200 with their eyes facing upwardly, such that the organs of the fish 24 are on the right side of the fish 24 so as to be properly removed with the head and organ cutter 216, as illustrated in FIG. 6. Quick, error-free placement of the fish 24 in this orientation is not difficult, since the upper side of the fish 24 is typically a darker color than the under side. The fish 24 may be placed on the conveyor 200 by workers standing on one side or the other of the conveyor 200, or by any other means, such as another conveyor system. If workers are used to place the fish on the conveyor 200, the length of the conveyor 200 may be extended so that two or three workers may be positioned side-by-side, all having access to a fish bin (not shown).

The conveyor 200 is driven by a conveyor drive chain 276 that is coupled to a forward roller 278 of the conveyor 200 through a gear. The conveyor drive chain 276 extends to a motor (not shown) controlled by the computer to advance the fish 24 through the conveyor 200 and into the drive belts 222, 224 of the second station 220 at a desired speed.

The downstream end of the conveyor 200 includes the jaws 202 that measure the length of the fish 24. Before the fish 24 enters the jaws 202, a tail spring 274 places a downward force on the tail of the fish 24 to keep it within the channel 270 down the center of the belt to further accurately center the fish 24 before it is fed through the measuring jaws 202 and into the drive belts 222, 224. Preferably, the spring 274 is constructed of spring steel and connected above the center of the conveyor 200 at the downstream end of the conveyor 200. The end of the spring 274 is pointed toward the downstream end of the conveyor 200. The end of the spring 274 tapers toward its center in a downstream direction and includes flanges on its sides that are directed downwardly to ride over the fish 24 and align the tail end of the fish 24.

As the fish 24 is advanced under the tail spring 274, it enters the jaws 202 and begins to separate them as the body of the fish enters into a funnel portion 280 at the end of the jaws 202. The jaws 202 are constructed with two arms, a left arm 282 and a right arm 284, that pivot about a left jaw pivot 286 and a right jaw pivot 288, respectively, located on opposite sides of the conveyor 200. The arms 282, 284 extend inwardly and downstream of the jaw pivots 286, 288. The funnel portion 280 is connected at the downstream end of the arms 282, 284. The funnel portion 280 has somewhat of a funnel shape when closed together before the fish 24 enters the funnel. The wide end of the funnel portion 280 connects to the arms 282, 284 of the jaws 202. Springs 290 bias the arms 282, 284 in a closed direction with the funnel portions 280 together. The springs 290 are disposed at the upstream end of the arms 282, 284. The springs 290 are connected between the conveyor frame 272 and spring projections 292 extending inwardly toward the center of the conveyor 200 from the upstream ends of the arms 282, 284 such that the springs 290 pull on the inside of the jaw pivots 286, 288. This biasing of the arms 282, 284 toward the center of the conveyor 200 causes the funnel to ride along the contours of a fish 24 as it is advanced out the end of the conveyor 200.

The arms 282, 284 and a jaw linkage 294 that interconnects the arms 282, 284 at their upstream ends also aids in centering the fish 24 as it is fed into the second-station drive belts 222, 224. The jaw linkage 294 comprises a first link 296, fixed to the left arm 282; a second link 298, pivotally attached to the first link 296; and a third link 300, pivotally attached to the second link 298. The third link 300 is fixed to the right arm 284 at the right jaw pivot 288 through the vertical axle of the right jaw pivot 288. The first link 296 is fixed to the left arm 282 at the left jaw pivot 286 through the vertical axle of the left jaw pivot 286. The first link 296 is connected above the left arm 282 so that there is proper clearance between it and the left jaw spring 290. The first link 296 extends a short distance in a generally upstream direction, where it is pivotally connected at its upstream end to the second link 298. The third link 300 is pivotally connected to the right jaw pivot 288 in a manner similar to the connection of the first link 296 to the left jaw pivot 286. The third link 300 does not move relative to the right arm 284 such that movement of the right arm 284 also moves the third link 300. The third link 300 extends from the right jaw pivot 288 in a generally downstream direction to a pivotal connection with the second link 298 at its downstream end. The second link 298 extends from the upstream end of the first link 296 to the downstream end of the third link 300 to thereby span across the top of the conveyor 200. With the arms 282, 284 in a closed position, the first link 296 and the third link 300 are oriented generally parallel to one another. The length of the first link 296 between its connection to the left jaw pivot 286 and the second link 298 is substantially the same as the length of the third link 300 between the right jaw pivot 288 and the second link 298. Because of this configuration of the jaw linkage 294, the opening of the arms 282, 284 and funnel portions 280 of the jaws 202 are controlled such that each opens at the same rate, and thus the same distance. As the advancing fish 24 forces the jaws 202 open, the fish is centered within the jaws 202 and as it is fed into the drive belts 222, 224 of the second station 220.

The length sensor 206 of the invention will now be described. The length sensor 206 includes a measuring strip 302 that is connected to the right arm 284 of the jaws 202 and an magnetic sensor 304 that senses when the strip 302 passes in front of it. The measuring strip 302 is made up of a strip of metal that is bent into a segment of a circle with a center point being the right jaw pivot 288. The strip 302 is attached on its left side to the right arm 284 of the measuring jaws 202. The right side of the measuring strip 302 is also connected to the right arm 284 of the measuring jaws 202 through a support member 306 that extends to the right jaw pivot 288. The magnetic sensor 304 indicates to the computer when the measuring strip 302 passes in front of it. The measuring strip 302 is arranged such that it passes in front of the magnetic sensor 304 when the jaws 202 begin to open and remains in front of the sensor 206 during the entire time that the jaws 202 are open. Thus, the length of the fish 24 can be calculated by the computer based on the time the jaws 202 are open and the speed of the conveyor 200. This data can then be used to derive the general dimensions of the fish 24 so that the cutters of the apparatus of the present invention can be moved accordingly as described below.

Preferably, the general dimensions of a sole are derived from a database containing at least five sets of data for the sole. Based on the length of the fish 24, one of the five sets of data about the overall dimensions are selected. The distribution of sole lengths is generally Gaussian with each of the five sets of data selected from five places on the normal curve. In the preferred embodiment, one of the five sets of data contains the general dimensions of a sole with a length falling at the median of the normal distribution. Second and third sets of data are from plus and minus one standard deviation. Fourth and fifth sets are from plus and minus two standard deviations. In operation, if the length of a sole is determined to be between the median and one standard deviation, the dimensions of a sole of median length are used. The next smallest set of data is used since it is important for quality to cut slightly too much meat from the fish 24 rather than leaving some of a fin. Obviously, more or fewer sets of data could be stored and accessed, depending on the operating speed of the equipment relative to the processor speed. If the processor is fast enough, standard sets of data need not be used, the dimensions of each fish 24 passing through could be calculated from its length. In the current preferred embodiment, the speeds are such that the above-described five sets of data are used so that the processor can send the signals to the cutters in time.

An alternative method of measuring the length of the fish includes using an electric eye that senses when the tail of the fish interrupts a beam of light that would pass downstream of the funnel portion 280 of the jaws 202 and upstream of the first and second drive belts 222, 224. A person skilled in the art will appreciate that various other electromechanical or electrical sensors could be employed to measure the length of the fish 24.

Figure 4:
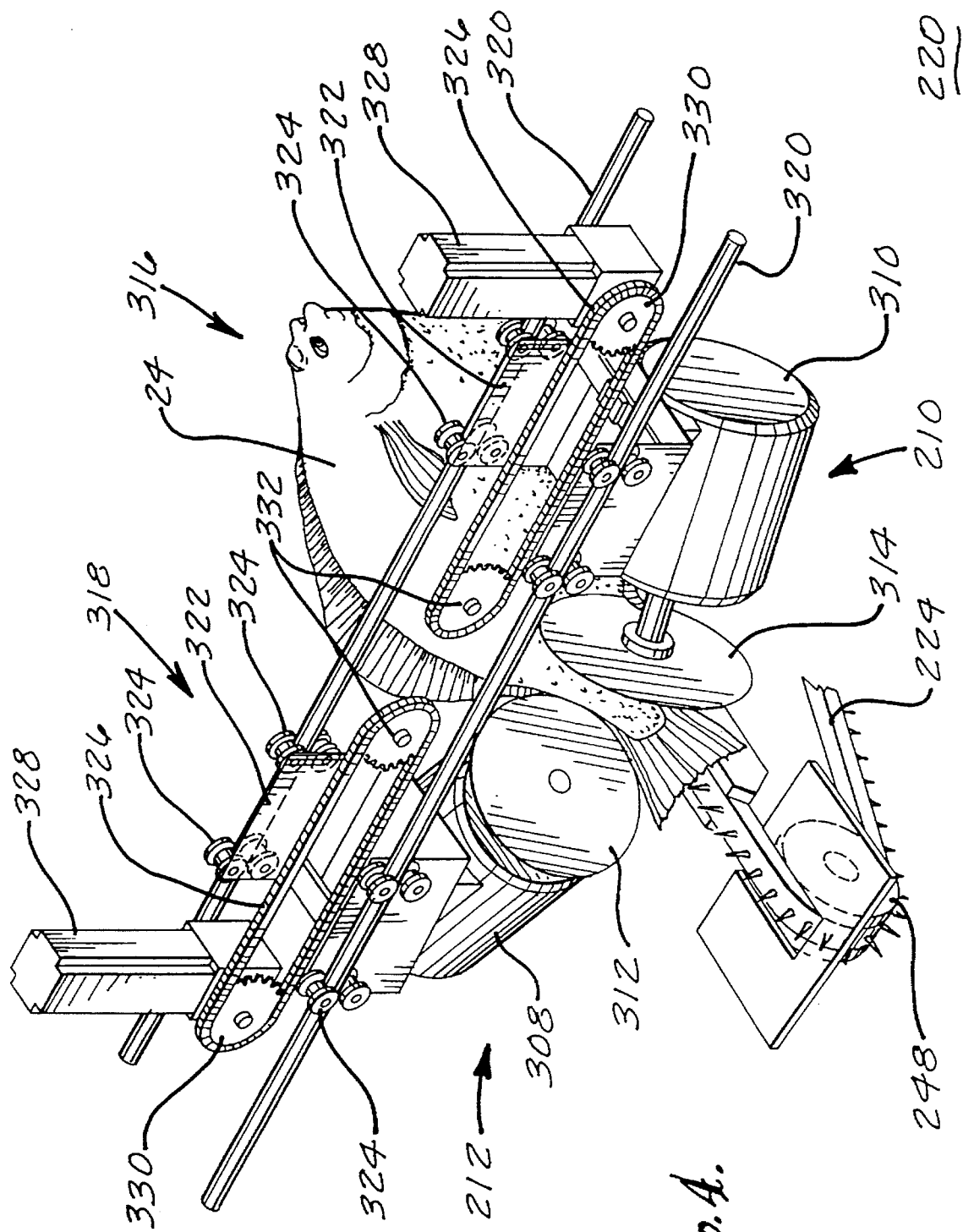
FIG. 4 is a perspective view illustrating the details of the transverse movement mechanism of the fin cutters.

As a fish 24 passes through the funnel portions 280 of the measuring jaws 202, it enters between the first and second drive belts 222, 224 of the second station 220 of the apparatus of the present invention (see FIG. 2). The fish 24 travels between these belts to the fin cutters 210, 212. As illustrated in FIGS. 4 and 5, the fin cutters 210, 212 remove the left and right fins from the fish 24 as the fish 24 is advanced. Please note that the first drive belt 222 has been removed from FIG. 4 for clarity of illustration of the fin cutter motors 308, 310 and carriages 316, 318. The fin cutters 210, 212 include left and right fin cutter motors 308, 310 connected to left and right circular blades 312, 314, respectively. The circular blades 312, 314 angle away from the vertical plane containing the first and second drive belts 222, 224 at about 15° to 20° in a downstream direction. This angle of cut of the circular blades 312, 314 allows the blades to follow the contour of the advancing fish 24. The blades 312, 314 can move both outwardly and inwardly to cut the fins from the advancing fish 24 without the face of the blades obstructing their transverse movement. The right and left fin cutters 210, 212 are in a narrow configuration near the first and second drive belts 222, 224 as the fish 24 begins to be cut by the left and right circular blades 312, 314 so that the portion of the fins at the narrow portion of the fish near the tail can be trimmed. As the fish continues to advance in a downstream direction, the fin cutters 210, 212 are moved outwardly and then inwardly in directions perpendicular to the movement of the fish 24 such that the fish contours are approximately followed in cutting away the left and right fins. This movement is controlled by the computer, which has converted the length data obtained as described above into approximate side contour data.

The mechanisms that move the left and right fin cutters 210, 212 are also illustrated in FIG. 4. Right and left carriages 316, 318 are used to move the motors 308, 310 transverse to the direction of movement of the fish 24. Right and left carriages 316, 318 ride on carriage rider rods 320, which are attached to the main frame of the cutting apparatus of the present invention. These rods 320 are disposed above right and left fin cutters 210, 212 and run parallel to each other and perpendicular to the drive belts 222, 224 in a horizontal plane. Carriage plates 322, having U-shaped cross sections, run from one carriage rider rod 320 to the other and are slidably attached to the carriage rider rods 320 by rider wheels 324. Rider wheels 324 are secured both above and below each carriage rider rod 320. Each carriage plate 322 has four sets of rider wheels 324 such that the carriage plate 322 and its connected fin cutter motor 308, 310 can only move transverse to the direction of movement of the fish 24. The fin cutter motors 308, 310 are not allowed to pivot or swing in any direction.

The bottom portion of the carriage plates 322 are connected to transverse drive chains 326 above each motor 308, 310 to move the carriage plates 322 and their connected fin cutter motors 308, 310 along the carriage rider rods 320. The transverse drive chains 326 run parallel to the carriage rider rods 320 and are connected to carriage motors 328. Transverse drive chains 326 extend around drive gears 330 at the carriage motors 328 and idler gears 332 positioned inward of the drive gears 330 toward the center of the cutting apparatus of the present invention. The carriage motors 328 are computer controlled such that they drive the fin cutter motors 308, 310 in and out to conform to the contours of a fish 24 advancing through the circular blades 312, 314 as explained above.

Figure 5:
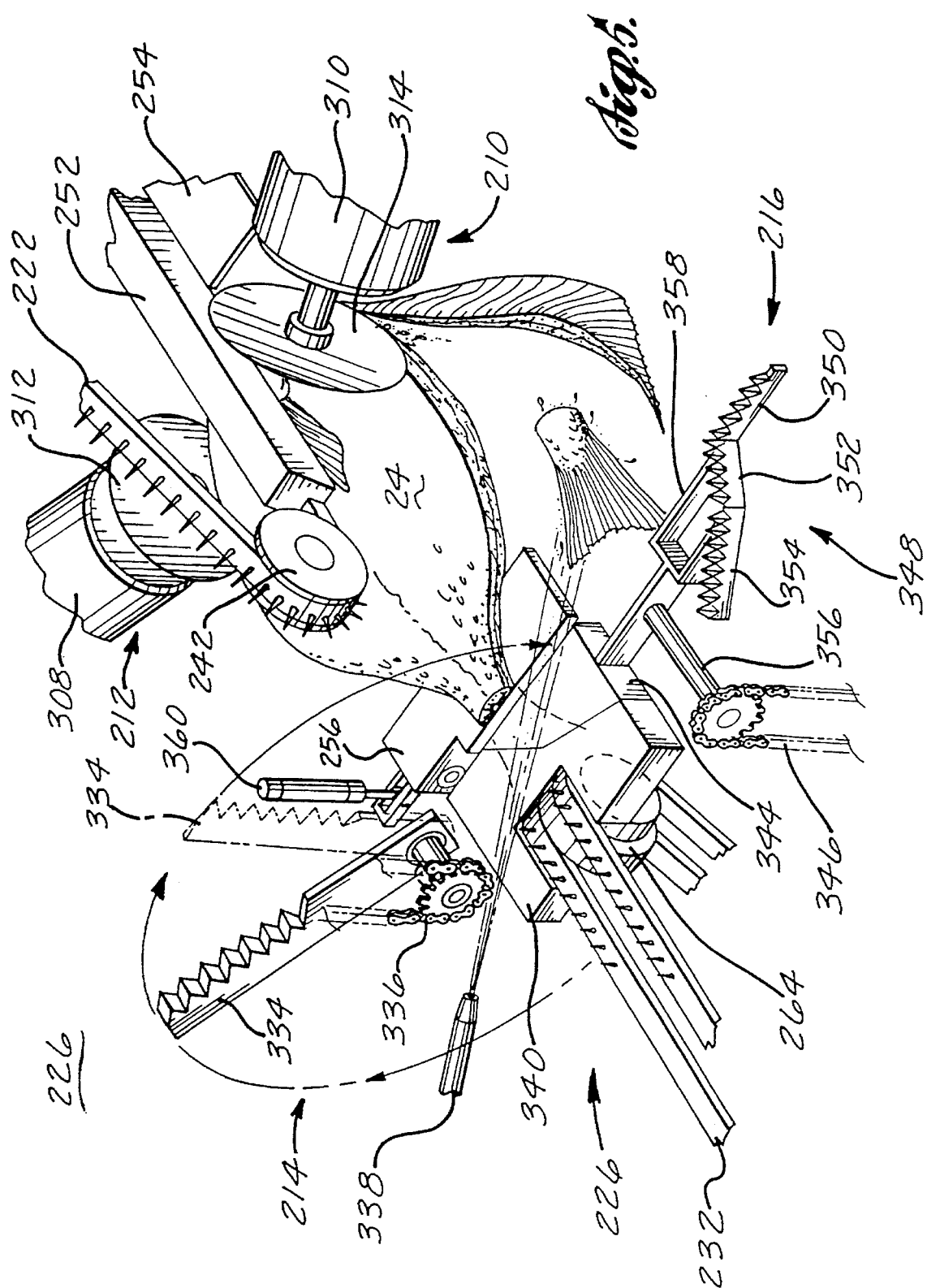
FIG. 5 illustrates the operation of the fin and tail cutters of the present invention.

FIG. 5 illustrates the cutting of the tail of the fish 24 as it is advanced downstream of the first and second drive belts 222, 224. The tail cutter 214 includes a tail blade 334 that is rotatably connected to the frame of the cutting apparatus of the present invention on the left side of the drive belts adjacent the space between the first and second drive belts 222, 224 and the third and fourth drive belts 230, 232. The blade 334 rotates in a vertical plane perpendicular to the direction of movement of the fish 24. The blade 334 is rotated with a tail blade drive 336, which includes a drive gear and chain connected to a drive motor (not shown).

As the fish 24 advances to the proper location, the computer sends a signal to the tail cutter drive motor, which then rotates the blade 360°. The blade 334 includes serrations on its leading edge, which quickly and cleanly cut through the tail portion of the fish 24, cutting the entire tail fin from the fish. As the tail blade 334 makes its 360° rotation and cuts through the fish 24, it moves between a head drop plate 256 and a head and organ cutter plate 344. These two plates 256, 344 will be described in more detail below in connection with FIG. 6.

A water jet 338, which is connected to the frame, sprays a water jet stream onto a support plate 340 and the head and organ cutter plate 344 on which the tail lies. The water jet stream pushes the tail to the side to drop into a waste receptacle (not shown). The water jet stream angles down to contact the support plate 340 and tail at approximately 20°. The force of the water jet stream is sufficient to move the tail aside while not upsetting the centering or position of the fish 24 as it passes in front of the water jet stream. The fish 24, besides having more mass than the tail by itself, is engaged in one or both sets of drive belts from the second and fourth stations 220, 228.

Referring now to FIG. 6, the operation of the head and organ cutter 216 will be described. The head and organ cutter 216 is disposed on the right side of the cutting apparatus of the present invention, opposite the tail cutter 214. The head and organ cutter 216 is driven by a head and organ blade drive 346, which connects to a drive motor (not shown). When signaled to do so by the computer, the drive motor rotates a head and organ blade 348 in a vertical plane perpendicular to the direction of travel of the fish 24. In this manner, the head of the fish, along with the internal organs of the fish, are cut away. To do so, the configuration of the head and organ blade 348 is in three portions. A first portion 350, perpendicular to the direction of travel of the fish 24, cuts behind the head of the fish 24. A second portion 352, which is angled at about 45°, is welded to the first portion. This portion cuts toward the tail end of the fish 24 around the fish organs. A third portion 354 is welded to the second portion 352 and is oriented at a second angle of about 30° from the first portion 350. This third portion 354 of the head and organ blade 348 finishes the cut behind the internal organs of the fish 24 such that the combination of the three portions of the blade completely severs the head and internal organs from the remainder of the fish. The head and organ blade 348, like the tail blade 334, has serrations along its leading edge.

The blade 348 is connected to a drive shaft 356 with a support member 358 that extends from the blade 348 to the drive shaft 356 and to the head and organ cutter plate 344. The shape of the cutter plate 344 is defined by the space in which the head and organ blade 348 must occupy as it removes the head and organs from the fish 24 when it makes its 360° rotation. Therefore, the downstream side of the plate has the mirror image of the angles of the second and third portions 352, 354 of the head and organ blade 348. The upstream side of the head and organ cutter plate 344 is perpendicular to the direction of travel of the fish 24 and when in place is opposite the head drop plate 256, allowing room for the tail blade 334 to pass between the two. When the head and organ blade 348 is not in use, the motor positions the head and organ cutter plate 344 such that its top surface is flush with the top surfaces of the head drop plate 256 and the support plate 340. By having the head and organ cutter plate 344 positively connected to the head and organ blade 348, the plate is necessarily removed from the path of travel of the head and organ blade 348 as it removes the head and organs of the fish that are thrown into a waste bin (not shown) beneath the support plate 340.

Besides the head and organ cutter plate 344 being moved out of the way for the head and organ blade 348, the head drop plate 256 is also moved downwardly so that the head will not be impeded in its downward motion by the head drop plate 256. The movement of the head drop plate 256 in a downward direction is accomplished by a pneumatic actuator 360 connected to the left side of the head drop plate 256. The head drop plate 256 is pivotally connected to the frame of the cutting apparatus, to the right of the connection to the pneumatic actuator 360, such that the head drop plate 256 can be pivoted downwardly when necessary by the pneumatic actuator 360.

It should be noted that during these cutting operations, as described above, the fish 24 continues to travel into the third and fourth drive belts 230, 232 (see FIG. 6). Thus, rotational movement of the head and organ cutter 216 and tail cutter 214 is quick.

At this point, the fish 24 has been properly cut and is ready to be advanced out of the cutting apparatus into an exit chute 362, which may be a fillet machine, other processing equipment, or simply a catch bin.

Figure 7:
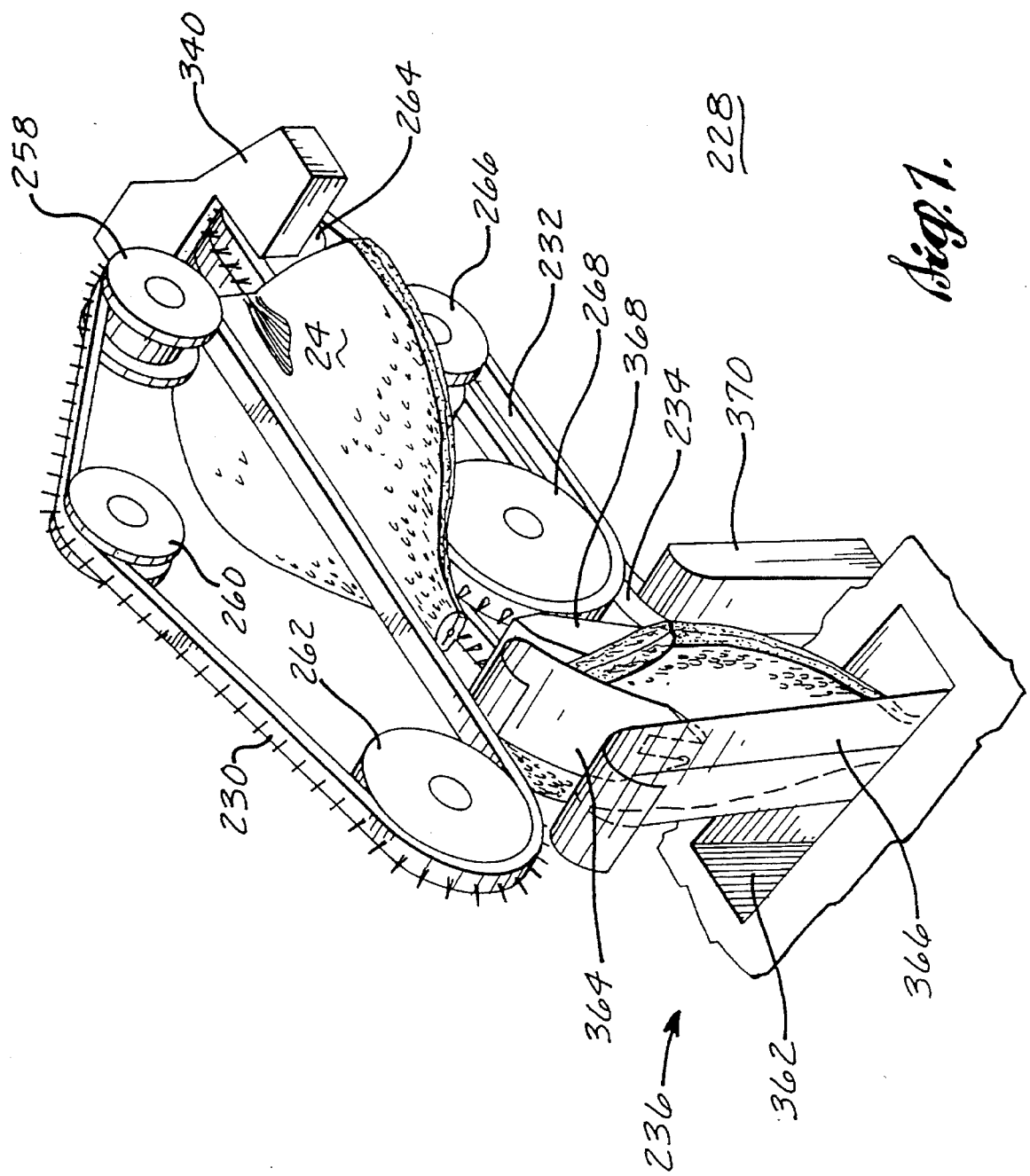
FIG. 7 is a perspective view illustrating the advancement of the processed fish into another fish processing machine or exit chute.

FIG. 7 illustrates the movement of the fish 24 into the exit chute 362. This is the fourth station 228 of the cutting apparatus. As the fish 24 advances between the third drive belt 230 and the fourth drive belts 232, it is transferred to the exit belt 234, which is coupled between the fourth drive belts 232 on the exit drive wheel 268. A primary exit spring 364 and a secondary exit spring 366 hold the fish against the exit belt 234 and channel the fish into the exit chute 362. The exit belt 234 leaves the exit drive wheel 268 and runs over a first exit guide block 368, which changes the direction of travel of the belt 234 downwardly in the direction of an exit belt idler wheel (not shown). The primary exit spring 364 is a flat piece of spring steel that has been curved slightly to the contour of the first exit guide block 368 and is disposed above the first exit guide block 368, such that when the tail end of the fish advances, the primary exit spring 364 rides over the top surface of the fish 24 to move it away from the third drive belt 230. Thus, the direction of movement of the fish 24 is changed from horizontal to vertical by the primary exit spring 364 and the exit belt 234, which runs over the first exit guide block 368. The fish 24 is further channeled into the exit chute 362 by the vertically-oriented secondary exit spring 366. The secondary exit spring 366 is also made of flat spring steel having a rectangular shape with a curved upper portion. The fish 24 travels between the secondary exit spring 366 and a second exit guide block 370 over which the spiked face of the exit belt 234 travels. In this manner, the fish is delivered to the exit chute 362.

The vertical, tail first orientation of the fish 24 as it enters the exit chute 362 is that required by typical fillet machines, such as the Baader Model 175 fillet machine. Thus, no workers are required to transfer the fish 24 between the cutting apparatus of the present invention and additional processing equipment, such as a fillet machine.

While the preferred embodiments of the invention has been illustrated and described, it will be appreciated that various changes can be made therein without departing from the spirit and scope of the invention.

The embodiments of the invention in which an exclusive property or privilege is claimed are defined as follows:

1. An apparatus for processing a flat fish comprising:

(a) measuring means for taking one or more fish measurements as the fish is advanced in a downstream direction along a processing path and for producing an output indicative of the fish measurement;

(b) controller means for determining the approximate geometry of the fish in response to the output from the measurement means and for producing an output signal; and (c) at least one rotating fin cutter that moves transversely relative to the processing path toward and away from the fish, following the approximate geometry of the fish to remove one or more fins of the fish in response to the output signal as the fish is advanced along the processing path.

2. The apparatus of claim 1, further comprising a holder for holding and centering the fish so that the fish may be cut along selected paths, the holder comprising:

(a) a conveyor having an upper surface upon which the fish rests; and (b) first and second stationary arms extending upwardly from the conveyor for securing and advancing the fish, the first and second arms including opposing slanted walls angled so as to simultaneously hold and center the head of the fish transversely over a width of the processing path.

3. The apparatus of claim 2, wherein the conveyor further includes a central channel within which the tail of the fish is placed in the downstream direction to center the fish on the conveyor such that the fish advances tail first.

4. The apparatus of claim 3, further comprising a tail spring attached to the conveyor over the central channel, the tail spring being arranged and configured to place a downward force on the fish directed into the central channel as the fish advances beneath the tail spring to aid in positioning and centering the tail in the central channel.

5. The apparatus of claim 1, wherein the measuring means comprise an electric eye that provides an indication of when the tail and the head of the fish each pass a predetermined location.

6. The apparatus of claim 1, wherein the measuring means comprise opposing jaws biased to a closed position, the jaws including a funnel portion through which the fish pass as they are advanced to help center the fish and a sensor to detect the opening and closing of the jaws, wherein the jaws aid in centering the fish as they pass through the funnel portion.

7. The apparatus of claim 1, wherein said at least one fin cutter comprises a right fin cutter disposed adjacent to the right of the fish and a left fin cutter disposed adjacent to the left of the fish.

8. The apparatus of claim 1 wherein the fin cutter comprises a circular blade and means to rotate said circular blade.

9. The apparatus of claim 1, further comprising a tail cutter that removes the tail of the fish, in response to the output signal, as the fish passes a predetermined downstream location.

10. The apparatus of claim 9, wherein the tail cutter is rectangular in shape and rotates in a direction transverse to the processing path.

11. The apparatus of claim 9, wherein the tail cutter removes the tail of the fish with a single rotation of the tail cutter.

12. The apparatus of claim 1, further comprising a head and organ cutter blade that removes the head and internal organs of the fish, in response to the output signal, as the fish passes a predetermined location.

13. The apparatus of claim 12, wherein the head and organ cutter blade rotates in a path generally transverse to the processing path, and wherein the head and organ cutter blade comprises a serrated blade having three rectangular sections connected together, the first section cutting through the fish behind the head, the second section cutting at an angle back past the organs, and the third section cutting behind the organs, such that the head and organs are cut from the fish with one strike of the head and organ cutter blade.

14. The apparatus of claim 1, further comprising means for positively engaging at least one of the upper and lower surfaces of the fish and for continuously advancing the fish through the apparatus, the means for engaging including one or more belts including outwardly projecting spikes that penetrate the fish and advance the fish as the belt moves.

15. The apparatus of claim 1, wherein a blade of the rotating fin cutter is oriented such that the forward edge of the blade forms an angle with the processing path.

16. A method for processing a flat fish, comprising the steps of:

(a) advancing the fish through a processing apparatus along a processing path;

(b) taking one or more measurements on the fish while the fish is being advanced along the processing path;

(c) producing a control signal indicative of the approximate dimensions of the fish using the measurement; and (d) moving the fish through rotational fin cutting means for moving in response to the control signal toward and away from the fish while cutting to cut around the contour of the fish as the fish is advanced;

(f) cutting the tail from the fish as the fish is advanced with a tail blade;

(g) cutting the head and organs from the fish with a head and organ blade as the fish continues to advance; and (h) to following the approximate geometry of the fish to remove one or more fins of the fish.

17. The method of claim 16, further comprising the step of removing the tail from the fish with a rotating blade that moves in response to the control signal.

18. The method of claim 16, wherein the removing step further comprises removing the tail from the fish with a single rotation of the rotating blade.

19. The method of claim 16, further comprising the step of removing the head and organs from the fish using a rotating blade that moves in response to the control signal.

20. The method of claim 19, wherein the step of removing the head and organs from the fish further comprises removing the head and organs from the fish using a blade having three sections connected together, the first section cutting through the fish behind the head, the second section cutting at an angle past the organs, and the third section cutting behind the organs.

* * * * *

UNITED STATES PATENT AND TRADEMARK OFFICE
CERTIFICATE OF CORRECTION

PATENT NO. : 5,466,186
DATED : November 14, 1995
INVENTOR(S) : Jens Hjorth

It is certified that error appears in the above-indentified patent and that said Letters Patent is hereby corrected as shown below:

| COLUMN | LINE | |
|---|---|---|
| 16 (Claim 16, | 21-27 lines 12-18) | "cutting to cut around the contour of the fish as the fish is advanced; <br> (f) cutting the tail from the fish as the fish is advanced with a tail blade; <br> (g) cutting the head and organs from the fish with a head and organ blade as the fish continues to advance; and <br> (h) to following" should read --cutting to follow-- |

Signed and Sealed this

Ninth Day of April, 1996

Attest:

BRUCE LEHMAN

*Attesting Officer*    *Commissioner of Patents and Trademarks*